(12) United States Patent
Bertozzi et al.

(10) Patent No.: US 7,949,097 B2
(45) Date of Patent: May 24, 2011

(54) METHODS AND APPARATUS FOR THE IDENTIFICATION OF MATERIALS USING PHOTONS SCATTERED FROM THE NUCLEAR "PYGMY RESONANCE"

(75) Inventors: William Bertozzi, Lexington, MA (US); Robert J. Ledoux, Harvard, MA (US)

(73) Assignee: Passport Systems, Inc., Billerica, MA (US)

( * ) Notice: Subject to any disclaimer, the term of this patent is extended or adjusted under 35 U.S.C. 154(b) by 164 days.

(21) Appl. No.: 12/346,237

(22) Filed: Dec. 30, 2008

(65) Prior Publication Data
US 2009/0279666 A1   Nov. 12, 2009

Related U.S. Application Data

(60) Provisional application No. 61/018,034, filed on Dec. 31, 2007.

(51) Int. Cl.
G01N 23/04 (2006.01)
G01N 23/20 (2006.01)
G01B 15/00 (2006.01)
(52) U.S. Cl. .................. 378/88; 378/57; 378/90
(58) Field of Classification Search .............. 378/44–46, 378/57, 86–88, 90
See application file for complete search history.

(56) References Cited

U.S. PATENT DOCUMENTS

| | | | |
|---|---|---|---|
| 5,115,459 A * | 5/1992 | Bertozzi | 378/88 |
| 5,420,905 A * | 5/1995 | Bertozzi | 378/88 |
| 7,092,485 B2 | 8/2006 | Kravis | |
| 7,120,226 B2 | 10/2006 | Ledoux et al. | |
| 7,286,638 B2 | 10/2007 | Ledoux et al. | |
| 7,564,241 B2 * | 7/2009 | Barty et al. | 324/304 |
| 2002/0015473 A1 | 2/2002 | Hertz et al. | |
| 2006/0188060 A1 | 8/2006 | Bertozzi et al. | |
| 2006/0256914 A1 * | 11/2006 | Might et al. | 378/57 |

FOREIGN PATENT DOCUMENTS

WO   WO 2005121756 A2 * 12/2005

OTHER PUBLICATIONS

International Search Report and Written Opinion for PCT/US08/88550.
J. Enders et al. "Electric Dipole Strength Below the Giant Dipole Resonance", Apr. 2005, Acta Physica Polonica B, vol. 36, Issue 4, p. 1077-1087.
"Nature of Low-Energy Dipole Strength in Nuclei: The Case of a Resonance at Particle Threshold in 208Pb ", N. Ryezayevea et al, Physical Review letters, vol. 89, No. 27, 272502-1—272502-4(2002).
International Search Report and Written Opinion for PCT/US08/88550. Dec. 2008.
J. Enders et al., "Electric Dipole Strength Below the Giant Dipole Resonance", Apr. 2005, Acta Physica Polonica B, vol. 36, Issue 4, pp. 1077-1087.

* cited by examiner

*Primary Examiner* — Anastasia Midkiff
(74) *Attorney, Agent, or Firm* — Foley Hoag LLP

(57) ABSTRACT

The scattered intensity of photons from the nuclear Pygmy Resonance taken in conjunction with the scattered intensity at lower energies provides a signal that is sensitive to the nature of the nuclear species doing the scattering. Highly enriched uranium and depleted uranium can be distinguished by this signal from other materials. Other nuclei can also be distinguished and identified. Methods and apparatus for employing the phenomenon to identify or assist in the identification of materials are disclosed.

9 Claims, 3 Drawing Sheets

Scattered photon spectra for 9 MeV bremsstrahlung normalized to 511 keV peak.

Schematic layout of some embodiments

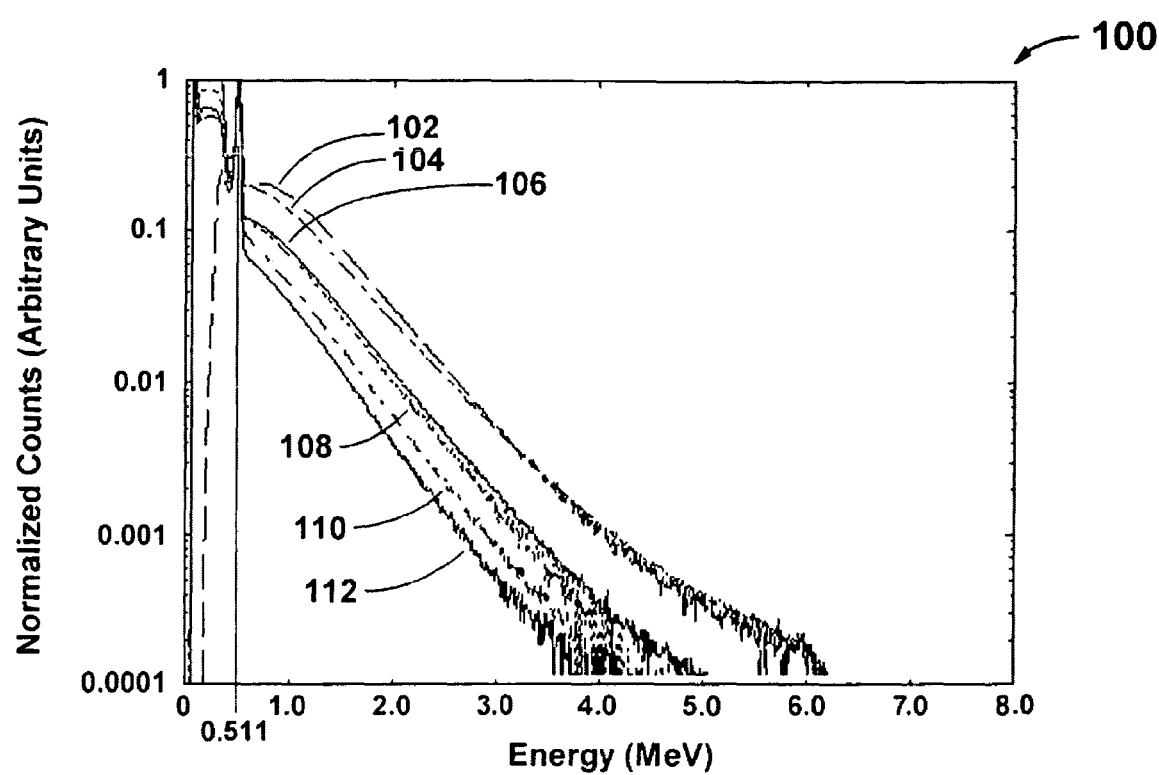
Figure 1: Scattered photon spectra for 9 MeV bremsstrahlung normalized to 511 keV peak.

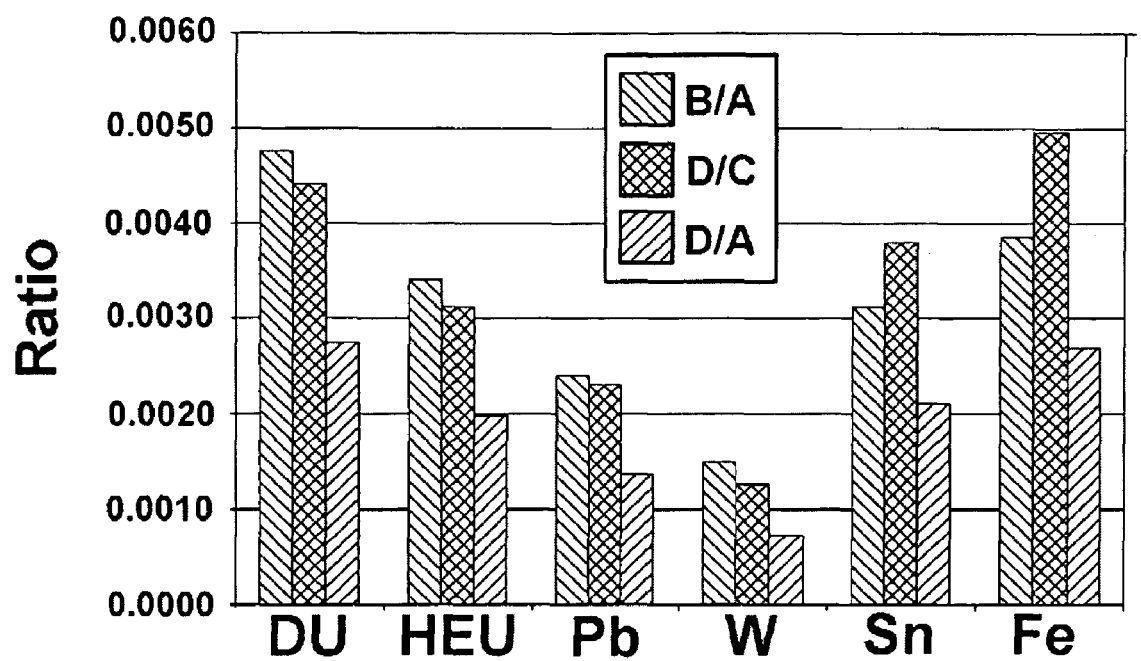
Figure 2: Ratios $R_1$ (B/A), $R_2$ (D/C) and $R_3$ (D/A) for different elements using 9 MeV bremsstrahlung.

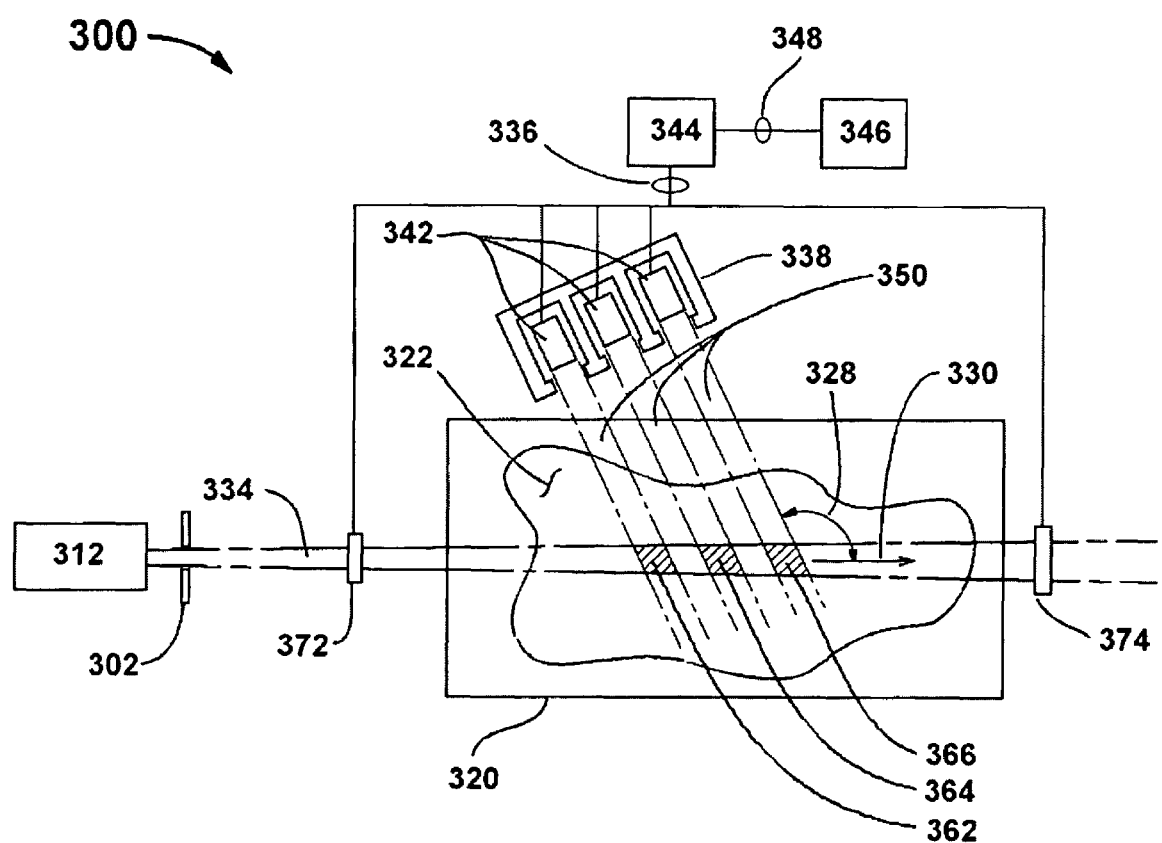
Figure 3: Schematic layout of some embodiments

US 7,949,097 B2

METHODS AND APPARATUS FOR THE IDENTIFICATION OF MATERIALS USING PHOTONS SCATTERED FROM THE NUCLEAR "PYGMY RESONANCE"

CROSS-REFERENCE TO RELATED APPLICATION

This present application claims priority to and the benefit of U.S. Provisional Patent Application Ser. No. 61/018,034 entitled "A Method for the Identification of Materials Using Photons Scattered from the Nuclear 'Pygmy Resonance'" which was filed on Dec. 31, 2007 by William Bertozzi and Robert J. Ledoux, and which is hereby incorporated herein by reference.

STATEMENT OF GOVERNMENT INTEREST

Portions of the disclosed subject matter were developed with support from the Department of Homeland Security (award issued by SPAWAR Systems Center), under Contract #s N66001-05-D-6011/0002 and N66001-07-D-0025/0001. The U.S. Government may have certain rights in those portions of the disclosed subject matter.

FIELD

This disclosure relates to the use of photons scattered from the nuclear "Pygmy Resonance" to enable or assist in the identification of nuclear species and materials. The nuclear species or materials may, for example, be included in a cargo or shipping container and the methods and systems disclosed herein may enable or assist in the detection and/or identification of contraband, security threats, and/or hazardous materials.

BACKGROUND

Spectra from nuclei with Z<A/2, where A is atomic weight and Z atomic number, generally display a so called "Pygmy Resonance" of varying strength. This resonance is generally observed as a peak in the scattered photon spectra at a photon energy in the vicinity of 7 MeV. The peak is generally a smooth and broad peak because the energy resolution of even high-resolution germanium detectors may be unable to resolve the individual states and there may be many such states grouped in a broad energy region. However, there are situations where some strong lines stand out over and above the broad peak and may be resolved. Lead (Pb) is one such case. The Pygmy Resonance is generally attributed to a collective electric dipole oscillation of the N-Z neutrons (N is neutron number and N-Z is sometimes referred to as the "neutron excess" of a nucleus) that do not participate in the portion of the giant electric dipole resonance observed at higher energies, for example, at approximately 12.5 MeV for nuclei in the region of the atomic number of Pb.

SUMMARY

It is an object of the disclosure to provide methods for the identification of or for assisting in the identification of and/or for spatially localizing a material such as an element or an isotope or a mixture thereof by measurement of and/or by analysis of photons scattered by the Pygmy Resonance in the nuclei in the material.

It is a further object of the disclosure to provide apparatus for identifying or for assisting in the identification of and/or for spatially localizing a material such as an element or an isotope or a mixture thereof by making and/or analyzing measurements of photons scattered by the Pygmy Resonance in the nuclei in the material.

BRIEF DESCRIPTION OF THE DRAWINGS

FIG. 1 shows scattered photon spectra from a variety of materials using incident 9 MeV bremsstrahlung photons.

FIG. 2 summarizes various ratios of counts in different energy regions of scattered photon spectra for different nuclei and materials.

FIG. 3 shows a schematic of a layout of one possible embodiment of apparatus for practicing the methods disclosed herein.

DETAILED DESCRIPTION OF EMBODIMENTS

The embodiments described herein are exemplary of the possible applications of the technology and methods disclosed for the identification of nuclei and materials via the photons scattered in the region of energy of the Pygmy Resonance compared to other portions of the scattered photon spectrum. Those experienced in the art will recognize that there are extensions, modifications and other arrangements of the important elements disclosed that can be implemented and they are included as part of this disclosure.

The Pygmy Resonance has been observed in photon scattering ("Nature of Low-Energy Dipole Strength in Nuclei: The Case of a Resonance at Particle Threshold in 208Pb", N. Ryezayevea et al, Physical Review letters, Volume 89, Number 27, 272502-1-272502-4 (2002) and references cited therein) by many experimenters.

In this disclosure data are presented using a NaI(Tl) detector for several exemplary targets and methods and apparatus for distinguishing the nuclei and materials in the various target materials based on scattering in the region of the Pygmy Resonance are disclosed.

FIG. 1 is a graph 100, showing the scattered spectra from six exemplary target materials: highly enriched uranium (HEU) 102; depleted uranium (DU) 104; lead (Pb) 106; tungsten (W) 108; tin (Sn) 110; and iron (Fe) 112. The specific sample of HEU used in this work was approximately 93% $^{235}$U. The spectra 102 through 112 are all plotted as normalized counts (in arbitrary units) as a function of scattered photon energy (in MeV). The first four materials are representative of common commercial cargo materials. The latter two are fissile materials whose detection is desired as is the possibility of distinguishing between them.

The target materials in FIG. 1 were irradiated using a continuous-spectrum beam of bremsstrahlung photons obtained by directing a 9 MeV electron beam onto a thick copper bremsstrahlung target. The measured photons are from scattering at 110 degrees. The resulting energy spectra have been normalized to the peak of the 0.511 MeV annihilation line. The spectra are appropriately corrected for differential effects of attenuation in detectors and target materials and backgrounds using conventional correction techniques that are well understood by those skilled in this art. See, for example, U.S. Pat. No. 7,286,638, Ledoux et al., "Methods And Systems For Determining The Average Atomic Number And Mass Of Materials", and U.S. Pat. No. 7,120,226, Ledoux et al., "Adaptive Scanning Of Materials Using Nuclear Resonance Fluorescence Imaging", both incorporated herein by reference. Although a thick copper bremsstrahlung target was used to generate the photons employed in irradiating the target materials when collecting the spectra in FIG. 1, many different bremsstrahlung target materials may be effectively employed; for those bremsstrahlung target materials commonly employed, only small changes to the energy spectra in FIG. 1 would result, not effecting the generality of the technique. The methods disclosed herein are not limited to a particular target material for generating bremsstrahlung photons. The design of the bremsstrahlung target depends on the nature of the photon beam desired and can be a material such as water cooled tungsten for beams of wide angular spread or of a design such as that contained in U.S. patent application Ser. No. 12/121, 515 (Bertozzi et. al.), "Thin Walled Tube Radiator For Bremsstrahlung At High Electron Beam Intensities," for beams of narrow angular spreads. Those experienced in the art will recognize the use of different bremsstrahlung target designs are possible and it is intended that all are included herein as part of this disclosure.

FIG. 2 summarizes various ratios of counts in different energy regions of the scattering spectra from graph 100. The energy regions are defined as:

A: 0.7-3.0 MeV
B: 4.5-7.0 MeV
C: 1.0-3.0 MeV
D: 5.0-7.0 MeV

The ratios of the counts in these energy regions for each target material are chosen, for example, to be:

B/A
D/C
D/A

These ratios have been chosen to be measures that can indicate the difference in the shapes of these spectra where one energy region in each ratio includes most of the Pygmy Resonance and the other energy region is well below the energy of the Pygmy Resonance. The energy regions chosen for the ratios and the ratios themselves are not intended to be the only such measurements that may be used to analyze the spectral data, but rather to illustrate examples of various possible measures that can extract information to distinguish the target materials.

These ratios are summarized in FIG. 2 in the form of a histogram for the three ratios B/A, D/C, and D/A for each of the target materials DU, HEU, Pb, W, Sn and Fe. The histogram shows how different ratios B/A, D/C, and D/A allow distinguishing the various target materials from each other and the relative ease or difficulty in making such a decision for various combinations of materials and various ratios. For best ease of detection, different ratios may be used to distinguish between different pairs of elements, and in particular to distinguish between targets of interest as potential threats, DU and HEU, and common-place materials in containers or other objects being examined, Pb, W, Sn and Fe. For example, D/A may be used to separate DU and HEU from Pb and W. Sn may be distinguished from HEU and DU by the ratios D/C and B/A, respectively, and Fe may be distinguished from HEU by the ratio D/C and from DU by the ratios B/A and D/C. Of course, others of the ratios also may be used to distinguish these materials from HEU and DU as well.

The details discussed herein are meant to be exemplary. Those skilled in the art will recognize that other ratios, other energy regions, other continuous-spectrum bremsstrahlung energies, and monochromatic or nearly monochromatic photon beams that span the selected photon energy ranges can be used to distinguish between materials with different nuclear species, and thus specific isotopes may be identified. Although the discussion has been limited to certain exemplary target materials, the use of the technique is not limited to those materials. The use of ratios to describe the spectra is also exemplary of more general techniques that compare the shapes of the spectra and establish criteria for identifying nuclear species or materials based on calibrated characteristics and the use of statistical methods such as that of maximum likelihood. The normalization of the spectra to the 0.511 MeV annihilation peak is also exemplary and alternative normalization techniques will suffice if normalization is desired, although normalization is not required for all techniques. Also, different detector arrangements and different scattering angles can be used to achieve results that distinguish between species and identify a species. These other modalities are all included as part of this disclosure.

While certain specific nuclei and materials are used herein to demonstrate the methods disclosed herein, those skilled in the art will recognize that other nuclei heavy enough to satisfy the requirement $Z<A/2$ can be identified by these techniques as well. These other nuclei are also included as part of this disclosure. It should also be noted that the techniques described herein may be used in combination with other techniques for determining the atomic number or weight of material in, e.g., a container in order to screen for threats or other material of interest. See, e.g., U.S. Pat. No. 7,286,638, Ledoux et al., "Methods And Systems For Determining The Average Atomic Number And Mass Of Materials", incorporated herein by reference.

FIG. 3 is a schematic of one embodiment of a system 300 for implementing the techniques disclosed herein. Other embodiments may have as part of their implementation some aspects of the arrangement shown schematically in FIG. 3. A photon source 312 may be collimated by collimator 302 to form a photon beam 334 that impinges on a target 322 contained in a container 320 to be inspected. Container 320 may be for example a shipping container, a cargo container, a suitcase or some other form of package to be inspected. Some of the photons in the beam 334 may scatter from the material in the target areas 362, 364 and 366, and impinge as scattered photons on one or more detectors 342. The view from the detectors 342 may be collimated by shield 338 or in other manners to form one or more collimated views 350 of portions of the target 322, for example target areas 362, 364 and 366 that are illuminated by the photon beam 334. The photon beam 334 has an axis 330. The detectors 342 and shield 338 may be oriented with respect to the beam axis 330 so that the collimated views 350 of the detectors 342 view photons scattered at a desired scattering angle 328. The scattering angle may be about 110 degrees or some other desired scattering angle.

The intersection of the beam 334 and the collimated views 350 by the detectors 342 of the target 322 define "voxels" spatially corresponding to the target areas 362, 364, and 366 within the target 322 that is being interrogated. Some of the photon beam 334 may interact with a monitor target 372 that may measure the incident photon flux. Some of the photon beam 334 is transmitted through the container 320 and the target 322 and may interact with a monitor target 374 that may measure the transmitted photon flux. Signals representing the incident photon flux and the transmitted photon flux may be transmitted to one or more computers 344, 346 via signal leads 336 and 348 or wirelessly. The detectors 342 may be sensitive to photon energy and be capable of recording and transmitting these signals to one or more computers 344, 346 via signal leads 336 and 348 or wirelessly. Computers 344 and/or 346 may record and analyze the nature of the signals received from the detectors 342 and/or the monitor targets 372 and 374 according to algorithms developed for the purpose of identification of the material in the target 322 in the container 320 according to the methods disclosed herein.

Shielding of the detectors 342 from the photon source 312 and from other incidental scatterers as well as the collimation of the view of the detectors may be achieved by, for example, shield 338 in a conventional manner as will be understood by those skilled in the art.

The photon source 312 may be continuously distributed in energy such as a bremsstrahlung source as described above.

The photon source 312 may be monochromatic or nearly monochromatic or limited to a range in energy such as those photons produced by one or a combination of techniques known to those skilled in the art, including: nuclear reactions such as (n,γ), (p,α) γ; Compton scattering; and laser backscattering. These monochromatic or limited energy range photon sources 312 may contain several photon "energy lines" and, optionally, only one or a few of those photon energy lines may be used in these embodiments. Those skilled in the art will recognize that there are many possibilities for the photon source 312 even though the source used to generate the data presented herein is a bremsstrahlung source, and they are all included in this disclosure as sources suitable for practicing the methods disclosed herein.

In some embodiments, to identify a nuclear species or material including a combination of species (such as HEU or DU) in a voxel corresponding to a target area 362, 364, 366, the ratios of counts in energy ranges A, B, C, and/or D and/or other possible ranges, or other mathematical analyses or parameterizations of the shape of the energy distribution or characteristics of the counts in each range may be determined. These results may be compared to a table of predetermined ratios, analyses and parameters for specific nuclear species and materials. The table may be prepared using predetermined calibration targets and photon sources, and the energy ranges and ratios and shape parameters of the energy distribution of the scattered photons may be prepared to make the determination of a nuclear species or material as sensitive as possible.

In other embodiments the identification of the nuclear species or material along a path through the target 322 may be used to calculate the total expected attenuation of the photon beam 334 along that path, and this expected attenuation may be compared to the attenuation of the beam 334 as determined by the measurements provided by a comparison of incident photon flux and the transmitted photon flux measured by the monitor targets 372 and 374. This comparison may then be used to alter the version of the comparison table used to determine the nuclear species or material. Further, any information on the material in the target 322 can be used to self-consistently correct the scattered photon distribution for effects such as energy dependence of photon absorption.

In other embodiments, the detectors 342 may include high-resolution detectors that use Nuclear Resonance Fluorescence (NRF) techniques to identify an isotope and its mass in a voxel corresponding to a target area 362, 364, or 366. This data may be used in combination with Pygmy Resonance data identifying a nuclear species or material in any of several ways. For example an isotope may be a contributor to the counts in the energy regions used for the identification methods based on the Pygmy Resonance disclosed herein, and may dilute the signal that is provided by the Pygmy Resonance to determine the presence of another nuclear species or material. The NRF data can be used to correct the signals for the contaminating isotope. See U.S. Pat. No. 5,115,459, Bertozzi, "Explosives Detection Using Resonance Fluorescence of Bremsstrahlung Radiation," U.S. Pat. No. 5,420,905, Bertozzi, "Detection of Explosives and Other Materials Using Resonance Fluorescence, Resonance Absorption, and Other Electromagnetic Processes with Bremsstrahlung Radiation," and U.S. Pat. No. 7,120,226, Ledoux et al., "Adaptive Scanning Of Materials Using Nuclear Resonance Fluorescence Imaging," the contents all of which are hereby incorporated by reference. It may be advantageous to use the techniques described herein in combination with techniques set forth in those patents to improve detection.

In some embodiments, a high-resolution detector 342 such as high purity germanium may be used. In others a lower resolution detector 342 such as a NaI(Tl) scintillator may be used. Other detectors 342 may be used in different combinations and they are all included in this disclosure.

Although the methods and systems have been described relative to specific embodiments thereof, they are not so limited. Obviously, many modifications and variations may become apparent in light of the above teachings. It will be understood by those skilled in the art that various changes in form and details may be made therein without departing from the scope of the disclosure. It should be realized that the methods and systems disclosed herein are also capable of a wide variety of further and other embodiments within the scope of the disclosure. Those skilled in the art will recognize or be able to ascertain using no more than routine experimentation, many equivalents to the exemplary embodiments described specifically herein. Such equivalents are intended to be encompassed in the scope of the present disclosure.

The invention claimed is:

1. A method of identifying a material in a target, comprising:
    a) illuminating at least a portion of the target with an incident photon beam with a continuous energy spectrum comprising multiple energies;
    b) for at least one preselected scattered photon energy range comprising energies of at least some photons scattered from a material of interest in a Pygmy Resonance energy region, measuring in at least one detector oriented to view at least a portion of the target at a preselected angle a number of photons scattered from said target in said preselected Pygmy-Resonance-scattered photon energy range;
    c) for at least one preselected scattered photon energy range not comprising energies of photons scattered from said material of interest in the Pygmy Resonance energy region, measuring in said at least one detector oriented to view at least said portion of the target at said preselected angle a number of photons scattered from said target in said preselected non-Pygmy-Resonance-scattered photon energy range; and
    d) based upon the numbers of photons measured in said at least one detector, in said at least one preselected Pygmy-Resonance-scattered photon energy range, and upon the numbers of photons measured in said at least one detector, in said at least one preselected non-Pygmy-Resonance-scattered photon energy range, determining that the material of interest is present in the target.

2. The method of claim 1, wherein said incident photon beam is a bremsstrahlung beam.

3. The method of claim 1, wherein said incident photon beam is limited to a preselected energy range.

4. The method of claim 3, wherein said incident photon beam is a bremsstrahlung beam generated in a thick electron beam target, and is collimated.

5. The method of claim 1, wherein the determination that the material of interest is present in the target is further based upon at least one result of a nuclear resonance fluorescence measurement.

6. The method of claim 1, wherein said preselected at least one non-Pygmy-Resonance-scattered photon energy range is below said preselected at least one Pygmy-Resonance-scattered photon energy range.

7. The method of claim 1, wherein the determination that the material of interest is present in the target is based upon at least one ratio of numbers of photons in one preselected Pygmy-Resonance-scattered photon energy range to numbers of photons in one preselected non-Pygmy-Resonance-scattered photon energy range exceeding a predetermined threshold.

8. The method of claim 1, wherein the determination that the material of interest is present in the target is based upon at least one ratio of numbers of photons in one preselected Pygmy-Resonance-scattered photon energy range to numbers of photons in one preselected non-Pygmy-Resonance-scattered photon energy range being less than a predetermined threshold.

9. The method of claim 1, wherein the determination that the material of interest is present in the target is based upon comparing a plurality of ratios of numbers of photons in preselected Pygmy-Resonance-scattered photon energy ranges to numbers of photons in preselected non-Pygmy-Resonance-scattered photon energy ranges to predetermined thresholds.

\* \* \* \* \*